(12) United States Patent
Sakata et al.

(10) Patent No.: US 8,521,425 B2
(45) Date of Patent: Aug. 27, 2013

(54) POSITION REGISTERING APPARATUS, ROUTE RETRIEVING APPARATUS, POSITION REGISTERING METHOD, POSITION REGISTERING PROGRAM, AND RECORDING MEDIUM

(75) Inventors: Daisuke Sakata, Kawagoe (JP); Kenichiro Yano, Tokyo (JP); Seiji Goto, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 750 days.

(21) Appl. No.: 12/282,559

(22) PCT Filed: Mar. 5, 2007

(86) PCT No.: PCT/JP2007/054215
§ 371 (c)(1),
(2), (4) Date: Sep. 11, 2008

(87) PCT Pub. No.: WO2007/105518
PCT Pub. Date: Sep. 20, 2007

(65) Prior Publication Data
US 2009/0030607 A1 Jan. 29, 2009

(30) Foreign Application Priority Data
Mar. 14, 2006 (JP) .................... 2006-069876

(51) Int. Cl.
*G06F 19/00* (2011.01)
*G01C 21/26* (2006.01)

(52) U.S. Cl.
USPC .......... 701/461; 701/527; 701/450; 701/430; 701/417; 701/412

(58) Field of Classification Search
USPC ................ 701/200, 461, 527, 450, 430, 417, 701/412, 201, 205, 207, 408, 409, 410, 209, 701/208, 400; 340/425.5, 995.14, 937, 988, 340/148, 435
See application file for complete search history.

(56) References Cited

U.S. PATENT DOCUMENTS

| 6,192,314 B1 | 2/2001 | Khavakh et al. |
| 6,381,537 B1 | 4/2002 | Chenault et al. |
| 6,424,895 B1 * | 7/2002 | Shimizu et al. ................ 701/41 |

(Continued)

FOREIGN PATENT DOCUMENTS

| JP | 07-114693 | 5/1995 |
| JP | 09-280881 | 10/1997 |

(Continued)

OTHER PUBLICATIONS

European Search Report—EP 07 73 7790—Aug. 30, 2010.

*Primary Examiner* — Ronnie Mancho
(74) *Attorney, Agent, or Firm* — Young & Thompson

(57) ABSTRACT

In a position registering apparatus, an acquiring unit acquires traveling state information indicating a traveling state of a mobile object and a position identifying unit specifies the current position of the mobile object, based on the traveling state information and map information. After the current position of the mobile object is identified to be on a road within a predetermined range from a destination set by a destination setting unit and is then identified to be at a place other than the road, if the parking determining unit determines that the mobile object is parked, a registering unit registers, into a storage unit, a deviation point from the road as an entrance point of a parking lot of the destination.

13 Claims, 9 Drawing Sheets

(56) References Cited

U.S. PATENT DOCUMENTS

| | | | |
|---|---|---|---|
| 6,704,653 B2 * | 3/2004 | Kuriya et al. | 701/301 |
| 7,043,346 B2 * | 5/2006 | Kubota et al. | 701/28 |
| 7,075,456 B2 * | 7/2006 | Tanaka et al. | 340/932.2 |
| 7,117,073 B2 * | 10/2006 | Endo et al. | 701/28 |
| 7,257,486 B2 * | 8/2007 | Shimazaki et al. | 701/300 |
| 7,706,944 B2 * | 4/2010 | Tanaka et al. | 701/41 |
| 2001/0026317 A1 * | 10/2001 | Kakinami et al. | 348/148 |
| 2002/0072849 A1 | 6/2002 | Endo et al. | |
| 2002/0133292 A1 | 9/2002 | Miyaki | |
| 2004/0039520 A1 * | 2/2004 | Khavakh et al. | 701/201 |
| 2005/0149259 A1 * | 7/2005 | Cherveny et al. | 701/208 |
| 2006/0058945 A1 * | 3/2006 | Watanabe | 701/200 |
| 2008/0033640 A1 * | 2/2008 | Amano | 701/209 |

FOREIGN PATENT DOCUMENTS

| | | |
|---|---|---|
| JP | 11-023302 | 1/1999 |
| JP | 11-23302 | 1/1999 |
| JP | 2001-116570 | 4/2001 |
| JP | 2004-12425 | 1/2004 |
| JP | 2005-037275 | 2/2005 |
| JP | 2005-337837 | 12/2005 |

* cited by examiner

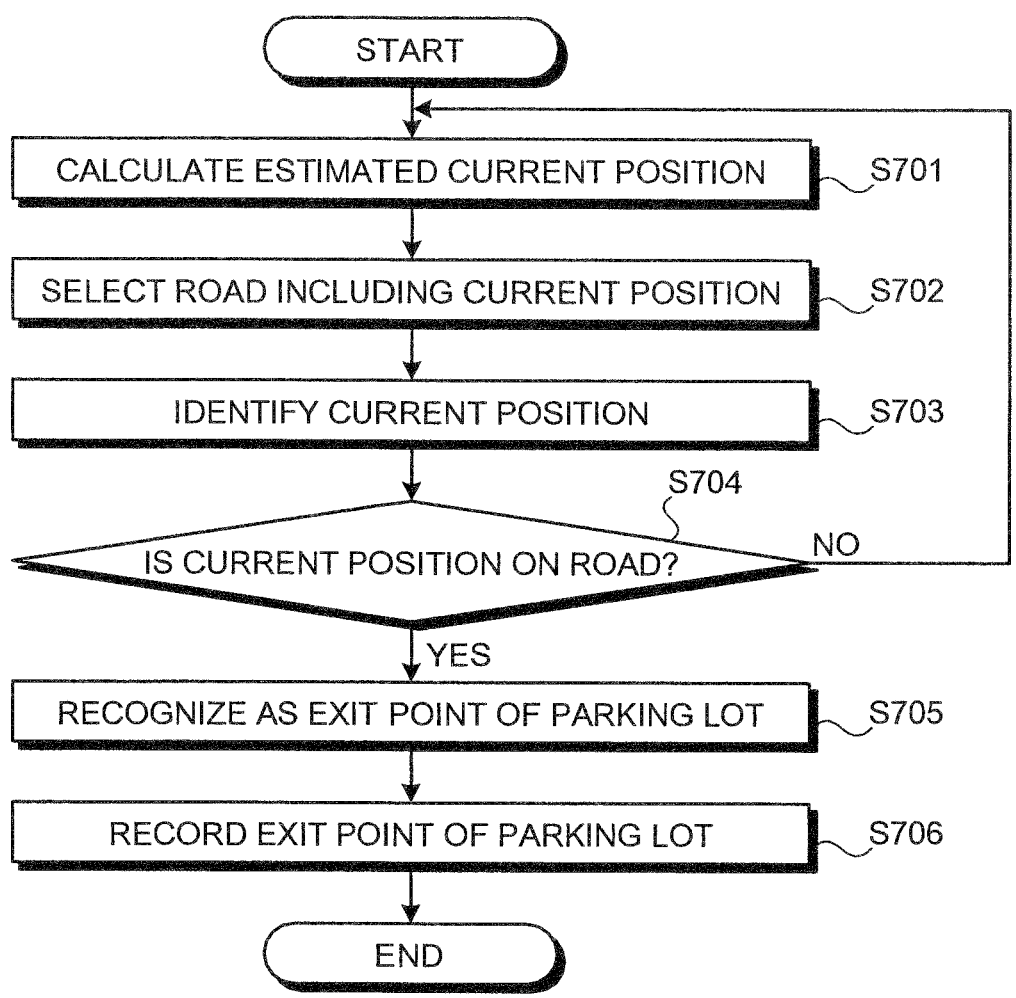

POSITION REGISTERING APPARATUS, ROUTE RETRIEVING APPARATUS, POSITION REGISTERING METHOD, POSITION REGISTERING PROGRAM, AND RECORDING MEDIUM

TECHNICAL FIELD

The present invention relates to a position registering apparatus, a route retrieving apparatus, a position registering method, a position registering program, and a recording medium capable of correlating and automatically recording an entrance and an exit of a parking lot near a predetermined destination.

BACKGROUND ART

Conventionally, an information providing apparatus has been provided that includes a current position calculating unit calculating a current position of a vehicle; a parking lot information acquiring unit acquiring parking lot information from the current position calculated by the current position calculating unit and parking lot locating data read from a map data storage unit; a route retrieving unit conducting route retrieval taking into account entrances and exits based on the information from the parking lot information acquiring unit and the map data storage unit; the map data storage unit storing map data and parking lot data; a display controlling unit conducting control for displaying a result of route retrieval taking into account entrances and exits retrieved by the route searching unit; and a displaying unit controlled by the display controlling unit and displaying the result of route retrieval taking into account entrances and exits, where the information providing apparatus can provide effective information taking into account entrances and exits of facilities such as parking lots (see, e.g., Patent Document 1).

Patent Document 1: Japanese Patent Application Laid-Open Publication No. 2004-12425

DISCLOSURE OF INVENTION

Problem to be Solved by the Invention

However, in the case of the information providing apparatus of the conventional art described in Patent Document 1, if the route retrieving unit retrieves a route to a parking lot when an entrance point to the parking lot is not recorded in the map information, the parking lot information. etc., only a route to the vicinity of the parking lot can be retrieved. Therefore, even if one can somehow arrive at the vicinity of the parking lot, it is problematic in that an entrance of the parking lot can not immediately be identified and that the entrance of the parking lot must be searched for after arrival, posing a significant inconvenience, for example.

Although it is conceivable to preliminarily record entrance points of parking lots for all the parking lots included in map information, parking lot information, etc., it is problematic in that data edit operations, etc., become very difficult due to an increase in the amount of recorded data, resulting in increased product cost, for example.

Although it is conceivable that entrance points and exit points are embedded in map information, parking lot information, etc., through operation and input by a user for parking lots utilized by the user, it is problematic in that associated input operations are troublesome for the user and improved convenience cannot be expected, for example.

Means for Solving Problem

To solve the problems above and achieve an object, a position registering apparatus according to the present invention includes an acquiring unit that acquires traveling state information indicating a traveling state of a mobile object; a destination setting unit that sets a destination; a position identifying unit that identifies a first position of the mobile object, based on the traveling state information and map information, to be on a road, and thereafter identifies a second position of the mobile object to be off the road after identifying that the first position of the mobile object is on the road; a destination setting unit that sets a destination; a parking determining unit that, after the first position of the mobile object has been identified to be on the road and then the second position of the mobile object has been identified to be off the road, determines that the mobile object is parked; and a registering unit that, after (i) identifying that the first position of the mobile object is on the road, (ii) identifying that the second position of the mobile object is off the road after identifying that the first position of the mobile object is on the road, and (iii) determining that the mobile object is parked off the road within a predetermined range from the destination, starts to register into a storage unit a first deviation point from the road an entrance point to a parking lot of the destination into a storage unit if it is determined that the mobile object is parked and the position of the mobile object is identified to be off a road after the position of the mobile object is identified to be on the road within a predetermined range from the destination.

A route retrieving apparatus according to the invention of claim 5 includes the position registering apparatus according to any one of claims 1 to 4; and a route retrieving unit that retrieves a route to the destination, where the route retrieving unit retrieves a route to the entrance point of the parking lot if an entrance point of the parking lot of the destination is registered.

A route retrieving apparatus according to the invention of claim 6 includes the position registering apparatus according to claim 4; and a route retrieving unit that retrieves a route to the destination. The route retrieving unit, when the current position of the mobile object is identified to be at a place other than a road, is within a predetermined range from the destination having an exit point registered, and a different destination is set, retrieves a route from the exit point to the different destination.

A position registering method according to the present invention includes an acquiring step of acquiring traveling state information indicating a traveling state of a mobile object; a setting step of setting a destination; an identifying step of identifying a first position of the mobile object, based on the traveling state information and map information, to be on a road and thereafter identifying a second position of the mobile object to be off the road after identifying that the first position of the mobile object is on the road; a saving step of temporarily saving a deviation point from the road to the place off the road; a parking determining step of determining, after the first position of the mobile object has been identified to be on the road and then the second position of the mobile object has been identified to be off the road, that the mobile object is parked; and a registering step of registering the deviation point as an entrance point to the parking lot of the destination when the deviation point is within a predetermined range from the destination and it is determined that the mobile object is parked.

A position registering program according to the invention of claim 8 causes a computer to execute the position registering method according to claim 7.

A computer-readable recording medium according to the invention of claim 9 stores therein the position registering program according to claim 8.

BRIEF DESCRIPTION OF DRAWINGS

FIG. 6-1 is a view of an example of a case when a vehicle deviates from a road to enter a parking lot of a destination;

FIG. 6-2 is an explanatory view of a process when a deviation point is detected;

FIG. 7 is a flowchart of another example of the position recording process procedure of the navigation apparatus according to the example of the present invention;

FIG. 8-1 is a view of an example of a case when a vehicle exits from a parking lot of the destination onto a road; and FIG. 8-2 is an explanatory view for explaining a process when a returning point is detected.

EXPLANATIONS OF LETTERS OR NUMERALS

Figure 1:
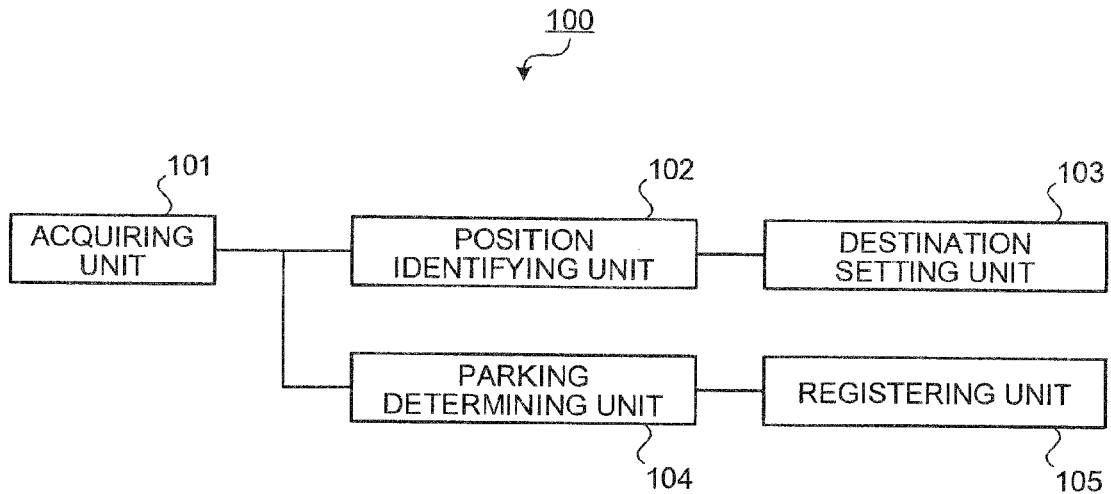
FIG. 1 is a block diagram of a functional configuration of a position registering apparatus according to an embodiment.

100 position registering apparatus
101 acquiring unit
102 position identifying unit
103 destination setting unit
104 parking determining unit
105 registering unit

BEST MODE(S) FOR CARRYING OUT THE INVENTION

A preferred embodiment is described hereinafter for a position registering apparatus, a route retrieving apparatus, a position registering method, a position registering program, and a recording medium according to the present invention with reference to the accompanying drawings.
(Embodiment)
(Functional Configuration of Position Registering Apparatus)

A functional configuration of a position registering apparatus according to an embodiment is described with reference to FIG. 1. FIG. 1 is a block diagram of a functional configuration of a position registering apparatus according to the embodiment. As shown in FIG. 1, a position registering apparatus 100 includes an acquiring unit 101, a position identifying unit 102, a destination setting unit 103, a parking determining unit 104, and a registering unit 105 parking determining unit 104.

The acquiring unit 101 acquires traveling state information indicating the traveling state of a mobile object. The traveling state information is information including position information, velocity information, and traveling direction information concerning the mobile object, for example. The traveling state information is calculated with the use of signals received from GPS satellites by a GPS receiver mounted on the mobile object or values output from various types of sensors disposed on the mobile object.

The position identifying unit 102 identifies the current position of the mobile object based on the traveling state information acquired by the acquiring unit 101 and map information. The map information is information such as road shape information consisting of nodes and links, and image data drawn with the use of features related to facilities, roads, and other geographic features (mountains, rivers, land).

For example, the position identifying unit 102 identifies the current position of the mobile object on a road by executing a map matching process to correct an estimated current position, which is the current position of the mobile object calculated from signals received from GPS satellites and output values of various sensors, or identifies the estimated current position directly as, for example, the current position of the mobile object at a place other than on a road.

The map matching process is a process of comparing the road shape data with position information, a traveling direction, a traveling distance, etc., of the mobile object to correct the position of the mobile object on a road if it is determined that the mobile object is moving on the road.

The destination setting unit 103 receives input from a user to set a destination. Specifically, for example, a user may manipulate an input unit to input the name of a place or the address of a destination, or may plot and input the destination on a map displayed on a displaying unit, not shown. The destination is not limited to a final destination at which a user wants to ultimately arrive, but also may be a via-point passed through on the way.

The parking determining unit 104 determines whether the mobile object is parked. Parking as used herein means a state in which the current position of the mobile object does not change (e.g., for five minutes). With regard to the determination of whether the mobile object is parked, the parking determining unit 104 determines that the mobile object is parked if, from the traveling state information, it is detected that the current position of the mobile object does not change from a place not on a road for a predetermined time.

The parking determining unit 104 may determine that the mobile object is parked if, from the traveling state information and the map information, it is detected that a second position of the mobile object is identified to be off the road within a range of a parking lot recorded in the map information after it is detected that a first position of the mobile object is identified to be on the road. The parking determining unit 104 may also determine that the mobile object is parked if it is detected that the driving source of the mobile object is stopped.

After (i) the first position of the mobile object is identified to be on a road, (ii) the second position of the mobile object is identified to be off the road, and (iii) it is determined that the mobile object is parked off the road after being on the road within a predetermined range from the set destination, the registering unit 105 starts to register, into a storage unit not shown, a deviation point from the road as an entrance point to a parking lot of the destination. The deviation point is the last position of the mobile object that is identified to be on the road by the position identifying unit 102 when the mobile object deviates from on the road to off the road.

The predetermined range is set according to the category of the destination and may be a direct distance or a distance along a road to the destination from the place where it is determined that the mobile object is parked. The category of the destination is classified by the type of the destination and respective predetermined ranges are set for a large facility such as an amusement park and a small facility such as a convenience store. Specifically, for example, the predetermined range is set to a radius of 1 km or less in the case of an amusement park and is set to a radius of 50 m or less in the case of a convenience store.

The registering unit 105 can register plural parking lot entrance points for one destination into the storage unit, not shown. For example, if the mobile object is parked more than once within a predetermined range of an amusement park and plural deviation points exist for these parking events, all of these deviation points are registered as entrance points of the amusement park parking lot.

After the entrance point of the parking lot of the destination is registered, if the second position of the mobile object is identified to be on the road and then a third position of the mobile object is identified to be on a road, the registering unit 105 registers, into the storage unit not shown, a returning point onto the road as an exit point of the parking lot of the destination. The returning point is the position of the mobile object identified to be on a road when the mobile object returns onto a road from off a road.

(Details of Process of Position Registering Apparatus)

Figure 2:
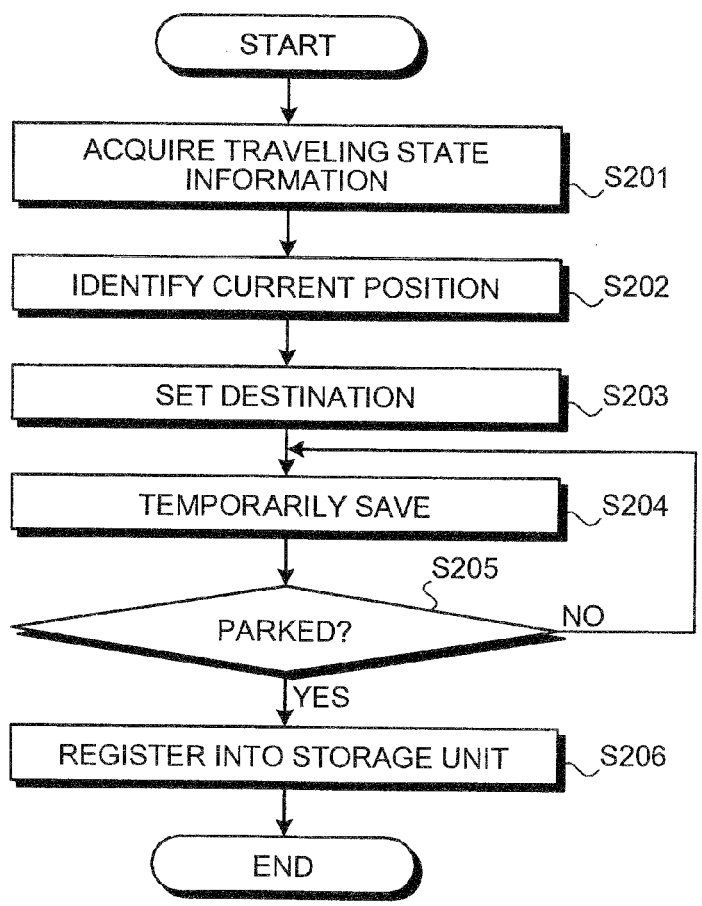
FIG. 2 is a flowchart of the process of the position registering apparatus according to the embodiment.

Details of the process of the position registering apparatus according to the present invention are described. FIG. 2 is a flowchart of the process of the position registering apparatus according to the embodiment. As shown in the flowchart of FIG. 2, in the position registering apparatus 100, the acquiring unit 101 acquires traveling state information indicating a traveling state of the mobile object (step S201). The traveling state information acquired by the acquiring unit 101 is information including position information, velocity information, traveling direction information, etc., of the mobile object.

The position identifying unit 102 identifies the one or more positions of the mobile object, based on the traveling state information acquired by the acquiring unit 101 and map information (step S202). One of the positions of the mobile object identified by the position identifying unit 102 may be, for example, the estimated position calculated from signals received from GPS satellites and values output from various sensors or the position obtained by correcting the estimated position by the map matching process.

The destination setting unit 103 then sets a destination (step S203). For example, the destination is set by a user manipulating an input unit not shown to input the name of a place or the address of the destination.

If the mobile object is identified to be on a road at a first position and is then identified to be off the road at a second position after identified to be on the road at the first position by the position identifying unit 102, a saving unit not shown temporarily saves, to the storage unit not shown, a deviation point from the road (step S204). The saving unit may temporarily save, to the storage unit, all the deviation points if the second position of the mobile object is identified to be off the road after the first position of the mobile object is identified to be on the road. The saving unit may temporarily save deviation points within a predetermined range from the set destination.

If the position (a second position) of the mobile object is identified to be off the road, the parking determining unit 104 determines whether the mobile object is parked (step S205). For example, the traveling state information acquired by the acquiring unit 101 and the map information are used to determine whether the mobile object is parked. Specifically, for example, when the position of the mobile object is identified to be off the road, if the position of the mobile object does not change for five minutes, it is determined that the mobile object is parked.

When it is determined that the mobile object is parked (step S205: YES), if the deviation point temporarily saved at step S204 is within a predetermined range from the destination, the deviation point is registered, into the storage unit not shown, as an entrance point to the parking lot of the destination (step S206), and a sequence of the processing of this flowchart is terminated.

If the saving unit is configured to temporarily save only deviation points within a predetermined range from the set destination at step S204, the registering unit 105 registers the temporarily saved deviation point as an entrance point of the parking lot of the destination at step S206.

If it is determined that the mobile object is not parked at step S205 (step S205: NO), the process returns to step S204 to repeat a sequence of the process.

(Functional Configuration of Route Retrieving Apparatus)

Figure 3:
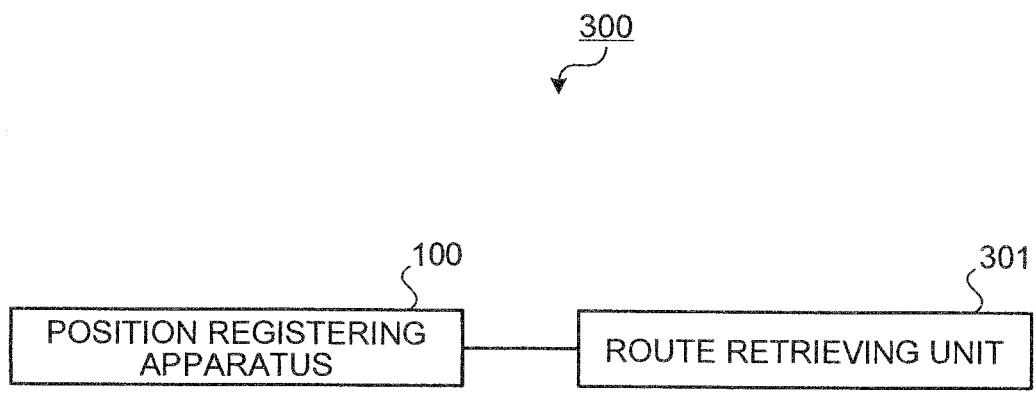
FIG. 3 is a block diagram of a functional configuration of a route retrieving apparatus according to the embodiment.

A functional configuration of a route retrieving apparatus according to the embodiment is described with reference to FIG. 3. FIG. 3 is a block diagram of a functional configuration of a route retrieving apparatus according to the embodiment. As shown in FIG. 3, a route retrieving apparatus 300 includes the position registering apparatus 100, and a route retrieving unit 301.

After the first position of the mobile object is identified to be on a road, and a second position of the mobile object is then identified to be off the road within a predetermined range from the destination as set above, if it is determined that the mobile object is parked, the position registering apparatus 100 registers a deviation point from the road as an entrance point of the parking lot of the destination. After the entrance point of the parking lot of the destination is registered, if a subsequent position of the mobile object is then identified to be on a road after the previous, second position of the mobile object is identified to be off a road, the position registering apparatus 100 registers a returning point onto the road as an exit point from the parking lot of the destination.

The route retrieving unit 301 retrieves a route to the destination set by the destination setting unit (see FIG. 1). When a route to the destination is retrieved, if an entrance point of the parking lot of the destination is registered, a route to the entrance point of the parking lot of the destination is retrieved. When the current position of the mobile object is identified to be within the parking lot of the destination (at a place other than a road and within a predetermined range from the destination) for which an exit point of a parking lot is registered, if a different destination is set by the destination setting unit 103, a route to the different destination is retrieved taking into account the exit point of the parking lot.

As described above, according to the embodiment, after the current position of the mobile object identified to be on a road is then identified to be at a place other than a road within a predetermined range from the set destination, if it is determined that the mobile object is parked, the position registering apparatus 100 can automatically register a deviation point from the road as an entrance 10 point of a parking lot.

After the entrance point of the parking lot of the destination is registered, after the position of the mobile object is identified to be off a road and a subsequent, third position is then identified to be on a road, the position registering apparatus 100 can register a returning point onto the road as an exit point of the parking lot of the destination.

It is determined whether the current position, which may be a first position, of the vehicle identified at step S504 is on a road (step S505). Specifically, for example, if the position of the vehicle identified at step S504 is a position corrected onto a road by the map matching process, it is determined that the position of the vehicle is on a road. If the position of the vehicle identified at step S504 is the estimated current position calculated at step S502, it is determined that the position of the vehicle is not on a road.

Therefore, the position registering apparatus 100 can automatically register the deviation point from a road and the returning point onto a road as the entrance point of the parking lot and the exit point of the parking lot, respectively, of the destination by specifying the current position of the mobile object within a predetermined range from the set destination.

The position registering apparatus 100 can determine whether the mobile object is parked when the current position of the mobile object is identified to be at a place other than a road. If it is determined that the mobile object is parked at a place other than a road, an entrance point of a parking lot is registered. This can prevent incorrect registration, such as registering an entrance point of a parking lot at a place that is not a parking lot, and enables more accurate registration of an entrance point of a parking lot in a case when the mobile object returns onto a road immediately after deviating from a road, for example.

When retrieving a route to the set destination, if an entrance of the parking lot of the destination is registered by the position registering apparatus 100, the route retrieving apparatus 300 can retrieve a more appropriate route by retrieving a route to the entrance point of the parking lot.

When the current position of the mobile object is identified to be in the parking lot of the destination for which an exit point of a parking lot has been registered, if a different destination is set by the destination setting unit 103, the route retrieving apparatus 300 can retrieve a more appropriate route by retrieving a route to the different destination taking into account the exit point of the parking lot.

An example according to the embodiment of the present invention is described in detail. The description is made by exemplarily illustrating a case where the position registering apparatus according to the embodiment is applied to a navigation apparatus mounted on a vehicle (including four-wheel vehicles and two-wheel vehicles) to record an entrance point/exit point of a parking lot.

EXAMPLE (Hardware Configuration of Navigation Apparatus)

Figure 4:
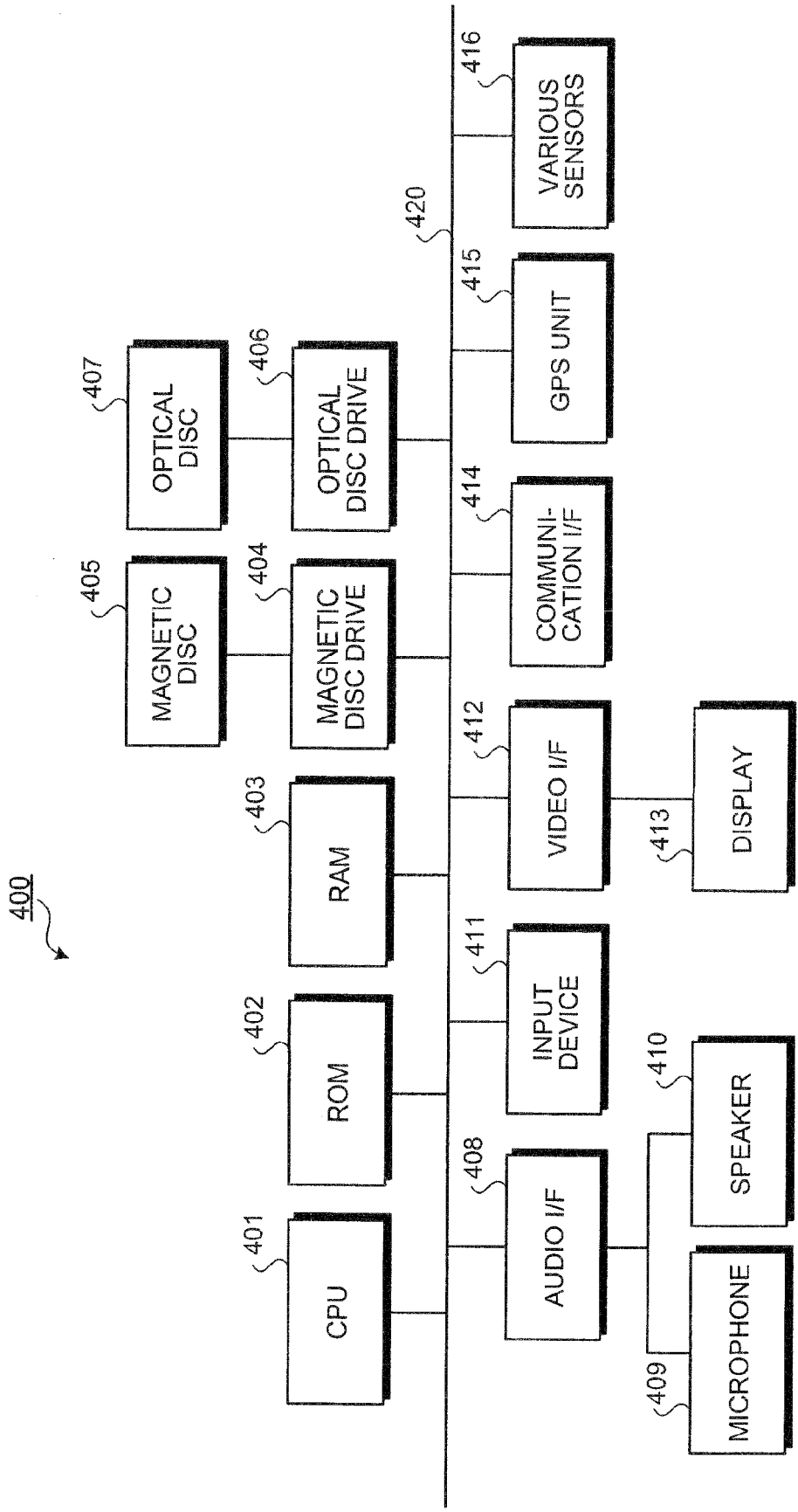
FIG. 4 is a block diagram of a hardware configuration of a navigation apparatus according to the example of the present invention.

A hardware configuration is described for a navigation apparatus 400 according to an example of the present invention. FIG. 4 is a block diagram of a hardware configuration of a navigation apparatus according to the example of the present invention. As shown FIG. 4, the navigation apparatus 400 includes, respectively connected through a bus 420, a CPU 401, a ROM 402, a RAM 403, a magnetic disc drive 404, a magnetic disc 405, an optical disc drive 406, an optical disc 407, an audio I/F (interface) 408, a microphone 409, a speaker 410, an input device 411, a video I/F (interface) 412, a display 413, a communication I/F (interface) 414, a GPS unit 415, and various sensors 416.

The CPU 401 governs overall control of the navigation apparatus 400. The ROM 402 stores therein various programs such as a boot program, a current-position calculating program, a current-position identifying program, a route retrieval program, a route guidance program, a sound generating program, a map-information display program, a communication program, a database generating program, a data analysis program, and a position recording program.

The current-position calculating program causes the current position of the vehicle (the current position of the navigation apparatus 400) to be calculated based on output information concerning the GPS unit and the various sensors 416 described later.

The current-position identifying program causes the current position of the vehicle to be identified to be on a road or at a place other than a road based on the current position (estimated current position) calculated by executing the current-position calculating program and the road shape data of the map information recorded on the magnetic disc 405 described later.

The route retrieval program causes the optimum route from a start point to a destination to be retrieved with the use of the map information, etc., recorded on the magnetic disc 405 described later. The optimum route is the shortest (or fastest) route to the destination or a route most satisfying a condition specified by a user. A guide route retrieved by executing the route retrieval program is output to the audio I/F 408 or the video I/F 412 though the CPU 401, for example.

The route guidance program causes route guidance information to be generated in real time based on guide route information retrieved by executing the route retrieval program, position information indicating the current position of the vehicle identified by executing the current-position identifying program, and the map information recorded on the magnetic disc 405 described later. The route guidance information generated by executing the route guidance program is output to the audio I/F 408 or the video I/F 412 though the CPU 401, for example.

The sound generating program causes information to be generated for tones and sounds corresponding to sound patterns. That is, audio guidance information corresponding to guidance points is caused to be generated based on the route guidance information generated by executing the route guidance program. The generated audio guidance information is output to the audio I/F 408 though the CPU 401, for example.

The map-information display program causes a display format of the map information that is displayed on the display 413 by the video I/F 412 to be determined and causes the map information to be displayed on the display 413 in the determined format.

The position recording program causes the entrance point or the exit point of the parking lot to be recognized with the use of the current position identified by the current-position identifying program and the map information recorded on the magnetic disc 405 described later. The recognized entrance point or exit point from the parking lot is caused to be recorded in a recording medium such as the magnetic disc 405 and the optical disc 407 described later or a memory not shown.

The RAM 403 is used as a work area of the CPU 401, for example.

The magnetic disc drive 404 controls the reading/writing of data from/to the magnetic disc 405 under the control of the CPU 401. The magnetic disc 405 stores thereon the data written under the control of the magnetic disc drive 404. The magnetic disc 405 may be an HD (hard disc) or an FD (flexible disc), for example.

An example of information recorded on the magnetic disc 405 includes map information used for route retrieval/route guidance. The map information includes background data representing features such as buildings, rivers, and ground surfaces, and road shape data representing shapes of roads. The map information is depicted two-dimensionally or three-dimensionally on the display 413. During the route guidance by the navigation apparatus 400, the map information and a vehicle mark are superimposed and displayed to indicate the current position of the vehicle.

The road shape data also includes traffic condition data. The traffic condition data includes, for example, information concerning the presence of a traffic light, a crosswalk, entrances/exits and junctions of expressways for nodes, and lengths (distances) of links, road widths, direction of travel, road types (such as expressway, toll road, general road), etc., for links.

Among the traffic condition data, information concerning past traffic congestion is stored as past traffic congestion information after statistical processing based on season, day of the week, long holiday seasons, the time of day, etc. Although the navigation apparatus 400 acquires, for example, information concerning current traffic congestion from road traffic information received by the communication I/F 414 described later, the past traffic congestion information can be used to forecast congestion at a specified time of day, for example.

Although the map information is recorded on the magnetic disc 405 in this example, the map information may be recorded on the optical disc 407 described later. The map information is not limited to being recorded in the constituent units integrally provided among the hardware of the navigation apparatus 400 and may be provided externally from the navigation apparatus 400. In this case, the navigation apparatus 400 may acquire the map information through the communication I/F 414 via a network. The map information acquired in this way is stored in the RAM 403, for example.

The optical disc drive 406 controls the reading/writing of data from/to the optical disc 407 under the control of the CPU 401. The optical disc 407 is a removable recording medium and data is read from the optical disc 407 under the control of the optical disc drive 406. A writable recording medium can be utilized for the optical disc 407. The removable recording medium can be a medium other than the optical disc 407, such as an MO and a memory card.

The audio I/F 408 is connected to the microphone 409 for audio input and the speaker 410 for audio output. Sounds received by the microphone 409 are A/D—converted within the audio I/F 408. The speaker 410 may be disposed not only on the inside of the vehicle but also on the outside of the vehicle. The speaker 410 outputs sounds based on audio signals from the audio I/F 408. The sounds input from the microphone 409 can be recorded as audio data on a recording medium such as the magnetic disc 405, the optical disc 407, or on a memory not shown.

The input device 411 includes a remote controller including keys for entering characters, numeric values, and various instructions, a keyboard, a mouse, a touch panel, etc.

The video I/F 412 is connected to the display 413. Specifically, the video I/F 412 includes, for example, a graphic controller that generally controls the display 413, a buffer memory such as VRAM (Video RAM) that temporarily stores immediately displayable image information, and a control IC that controls the display 413 based on image data output from the graphic controller.

The display 413 displays icons, cursors, menus, windows, or various data such as text and images. For example, a CRT, a TFT liquid crystal display, a plasma display, etc., can be employed as the display 413.

The communication I/F 414 is wirelessly connected to a network and functions as an interface between the navigation apparatus 400 and the CPU 401. Further, the communication I/F 414 is wirelessly connected to a communication network such as the internet and functions as an interface between the CPU 401 and the communication network.

The network includes a LAN, a WAN, a public line network, a portable telephone network, etc. Specifically, the communication I/F 414 includes, for example, an FM tuner, a VICS (Vehicle Information and Communication System: registered trademark)/beacon receiver, a radio navigation apparatus, and other navigation devices, and acquires the road traffic information, concerning for example congestion and traffic regulations, distributed from VICS centers.

The GPS unit 415 receives signals from GPS satellites and outputs information indicating the current position of the vehicle. The information output by the GPS unit 415 is used along with output values of the various sensors 416 described later when the CPU 401 calculates the current position (estimated current position) of the vehicle. The information indicating the current position is information identifying one point on the map information, for example, latitude/longitude and altitude.

The various sensors 416, including a vehicle speed sensor, an acceleration sensor, and an angular speed sensor, output information that can be used to determine the position and behavior of the vehicle. The values output by the various sensors 416 are used by the CPU 401 for calculating the current position (estimated current position) of the vehicle and measuring variations in velocity and direction.

The various sensors 416 include a sensor that detects vehicle operations by a driver. The vehicle operations detected may include steering operations, input for turn signals, the opening/closing of vehicle doors, the turning on/off of the engine (or the on/off of ACC power source), etc.

Specifically, with regard to the functional constituent units of the position registering apparatus 100 according to the embodiment shown in FIG. 1, i.e., the acquiring unit 101, the position identifying unit 102, the parking determining unit 104, and the registering unit 105, the functions thereof are implemented by the CPU 401, the magnetic disc 405, the GPS unit 415, and the various sensors 416, for example, while function of the destination setting unit 103 is realized by the input device 411. With regard to the functional constituent units of the route retrieving apparatus 300 according to the embodiment shown in FIG. 3, the function of the route retrieving unit 301 is implemented by the CPU 401 executing the route retrieval program recorded on the ROM 402, etc.

(Position Recording Process Procedure of Navigation Apparatus)

Figure 5:
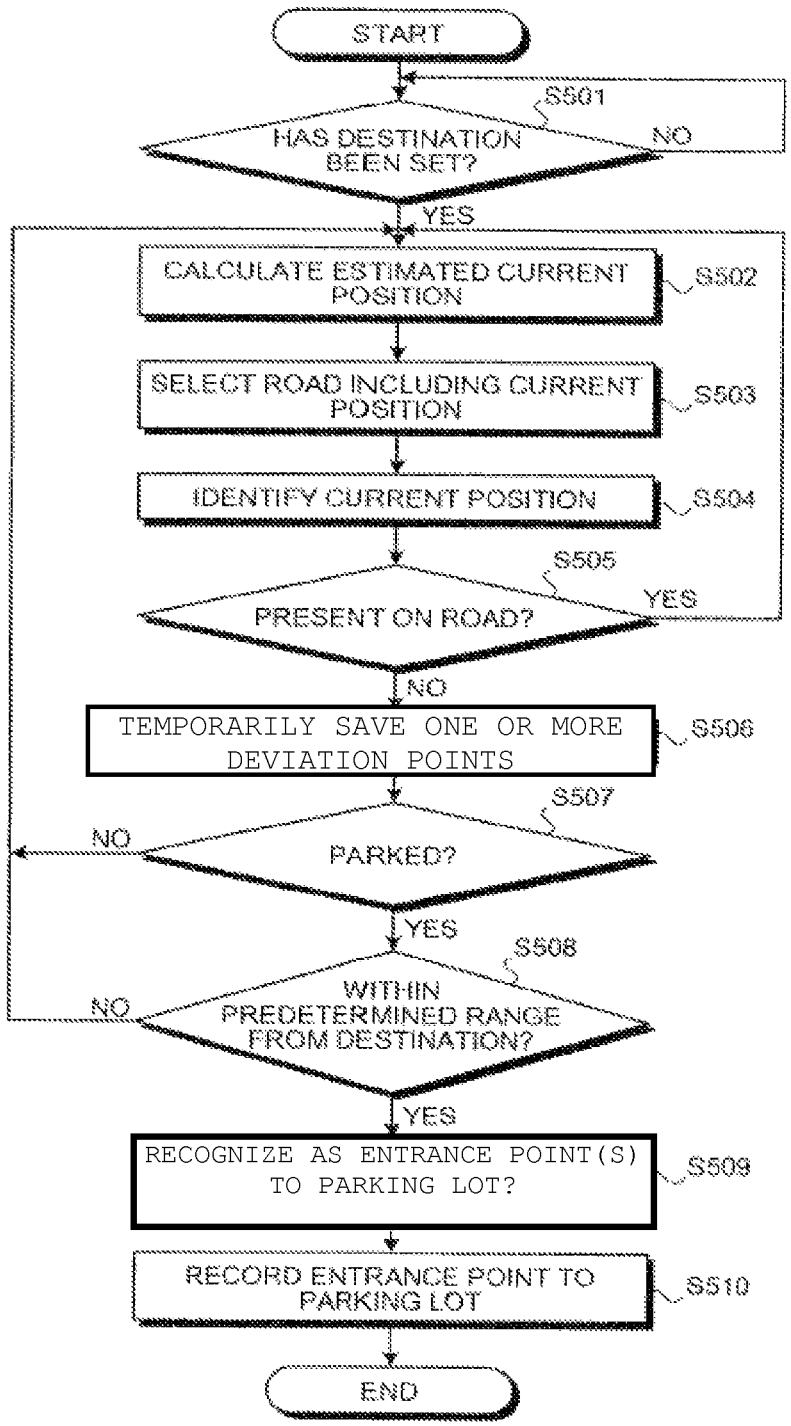
FIG. 5 is a flowchart of an example of a position recording process procedure of the navigation apparatus according to an example of the present invention.

An example of a position recording process procedure of the navigation apparatus 400 according to the example of the present invention is described. FIG. 5 is a flowchart of an example of the position recording process procedure of the navigation apparatus according to the example of the present invention.

As shown in the flowchart of FIG. 5, the navigation apparatus 400 determines whether a destination has been set through the input device 411 (step S501). The destination may be set by a user manipulating the input device 411 such as a remote controller, a keyboard, a mouse, and a touch panel to input the name of a place or the address of the destination.

At step S501, waiting occurs until the destination is set. When the destination is set (step S501: YES), the current position (the estimated position) of the vehicle is calculated based on information output from the GPS unit 415 and the various sensors 416 (step S502). The estimated current position is calculated based on position information indicative of the current position of the vehicle and obtained from the signals received from the GPS satellites, vehicle speed information output from the vehicle speed sensor, and vehicle angular speed information (information concerning the amount of change in the direction of the vehicle) output from the angular speed sensor.

Based on the estimated current position of the vehicle calculated at step S502, a road including the current position of the vehicle is selected (step S503). For example, a road closest to the estimated current position is selected as the road including the current position of the vehicle. Alternatively, a direction of a road present within a predetermined range from the estimated current position (road direction) may be compared with the traveling direction of the vehicle to select a road including the current position of the vehicle. If it is determined that the vehicle is not traveling on a road, no selection is made of a road including the current position of the vehicle.

The current position of the vehicle is identified based on the information concerning the estimated current position calculated at step S502 and the road shape data of the road selected at step S503 (step S504). For example, if a road including the current position of the vehicle is selected at step S503, the map matching process is executed to identify a position corrected by the map matching process as the current position of the vehicle on the road. If a road that includes the current position of the vehicle is not selected at step S503, the estimated current position calculated at step S502 is identified as the current position of the vehicle.

It is determined whether the current position of the vehicle identified at step S504 is on a road (step S505). Specifically, for example, if the current position of the vehicle identified at step S504 is a position corrected onto a road by the map matching process, it is determined that the current position of the vehicle is on a road. If the current position of the vehicle identified at step S504 is the estimated current position calculated at step S502, it is determined that the current position of the vehicle is not on a road.

At step S505, if it is determined that the current position of the mobile object is on a road (step S505: YES), the process returns to step S502 and repeats a sequence of the process.

If it is determined that a second position of the vehicle is not on a road at step S505 (step S505: NO) after it is determined that a first position of the vehicle is on the road, a deviation point where the vehicle has deviated from the road is temporarily saved in a memory, etc., not shown (step S506). The deviation point is the last position of the vehicle identified to be on the road. All the deviation points of the vehicle from a road to outside the road may temporarily be saved, or only deviation points located within a predetermined range from the destination may temporarily be saved.

It is then determined whether the vehicle is parked at a place other than a road (step S507). With regard to the determination of whether the vehicle is parked, for example, operations on the vehicle by a driver may be detected by the various sensors 416, etc., to perform the determination based on the detection result. Specifically, for example, if it is determined that the current position of the vehicle is not on the road and the engine of the vehicle is then turned off (or the ACC power source is turned off), it is determined that the vehicle is parked.

Alternatively, a case in which the vehicle has not moved from the same point for a predetermined period or longer, or in which a driver applies the parking brake or changes a shift position to the parking position, it is determined that the vehicle is parked.

Waiting occurs for the vehicle to be parked and if it is determined that the vehicle is parked at step S507 (step S507: YES), it is determined whether the temporarily saved deviation point is within a predetermined range of the destination (step S508). The predetermined range of the destination is set in accordance with the destination and is a range surrounded by a circle centered about the destination, for example. The predetermined range of the destination may be set in accordance with a type of the destination. For example, if the destination is a large facility such as an amusement park, a range surrounded by a circle with a radius of 1 km can be set, and if the destination is a small facility such as a convenience store, a range surrounded by a circle with a radius of 50 m can be set.

If the deviation point is within the predetermined range of the destination at step S508 (step S508: YES), the temporarily saved deviation point is recognized as an entrance point of the parking lot of the destination (step S509).

When the deviation point where the vehicle deviated from the road is detected, the deviation point may be detected with the use of traveling path information acquired by recording a traveling path of the vehicle. For example, if it is determined that the current position of the vehicle is not on a road, a traveling path of the vehicle before the determination may be traced back to detect the deviation point where the vehicle deviated from the road. A specific example for detecting the deviation point is briefly described here.

Figures 1, 6:
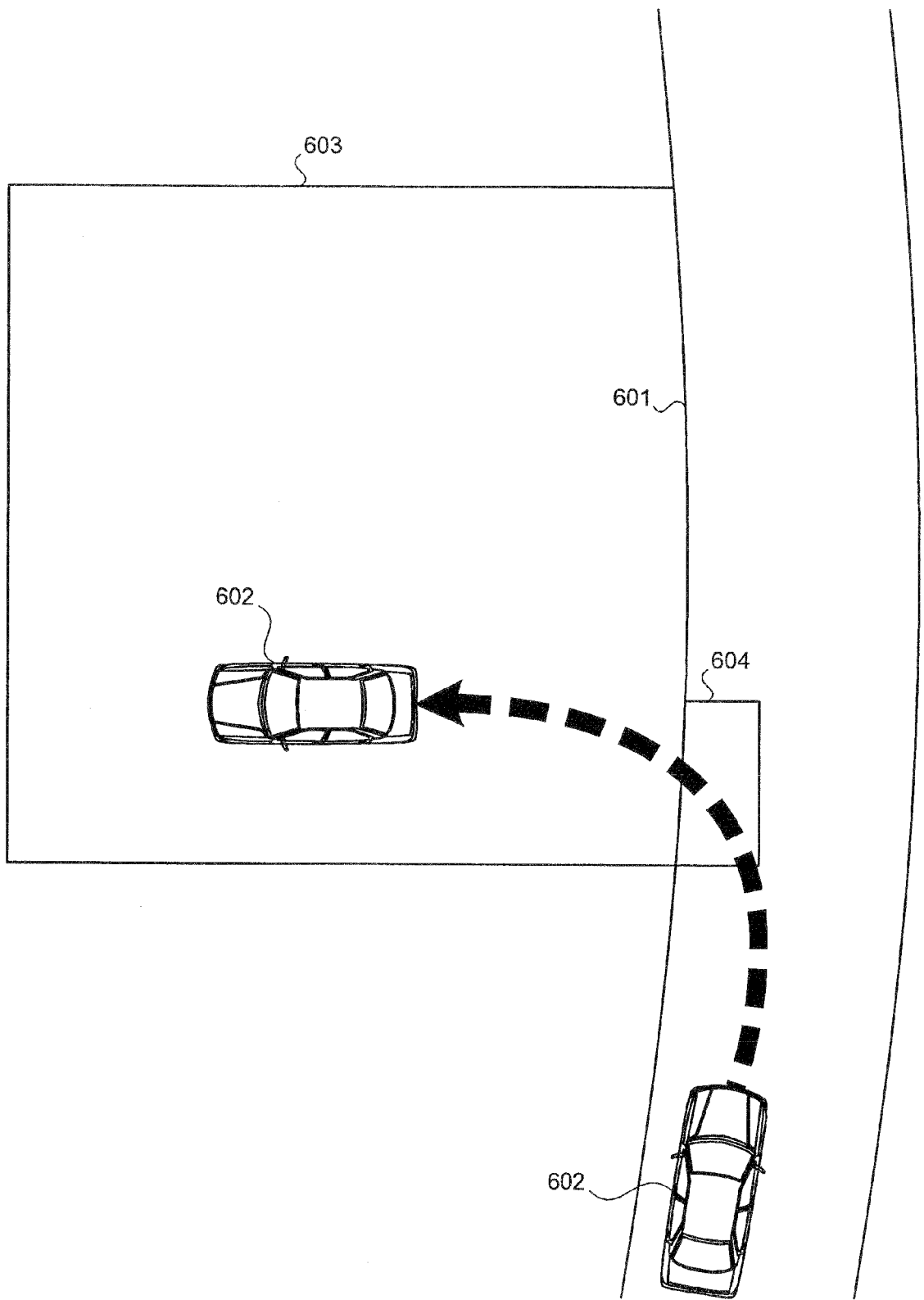
Figures 2, 6:
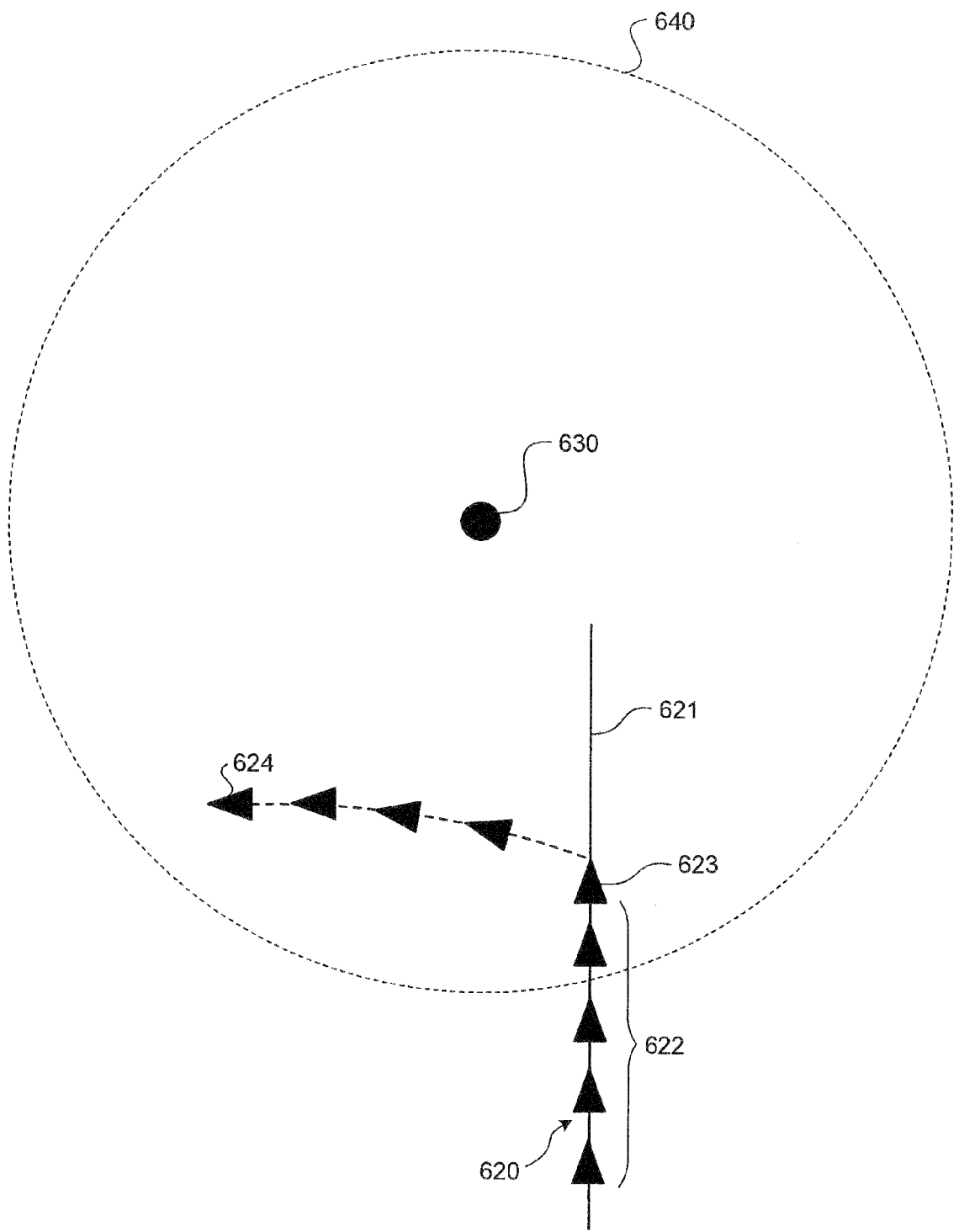

FIG. 6-1 is a view of an example of a case when a vehicle deviates from a road to enter a parking lot of a destination. FIG. 6-2 is an explanatory view of a process when the deviation point is detected. As shown in FIG. 6-1, a vehicle 602 traveling on a road 601 deviates from the road 602 and enters a parking lot 603 of the destination through a parking lot entrance 604 in this case.

A traveling path 620 of the vehicle 602 shown in FIG. 6-2 represents a traveling path of the vehicle until the vehicle 602 deviates from the road 601 and enters the parking lot 603 of the destination. Points indicated on the traveling path 620 indicate the current positions of the vehicle 602 at respective times, e.g., predetermined time intervals.

The deviation point of the vehicle 602 from the road 601 is detected from the current positions of the vehicle 602 indicated on the traveling path 620. Specifically, for example, based on the position information concerning the points indicated on the traveling path 620 and a road link 621 of the road 601 included in the road shape data, a point 623 identified as the last current position of the vehicle is calculated from road points 622 on the road 601, and the point 623 is defined as the deviation point of the vehicle 602 from the road 601.

If the detected deviation point (the position 623) is within the predetermined range 640 of the destination 630, the deviation point is recognized as the parking lot entrance 604 of the parking lot of the destination. Since this enables more accurate detection of the deviation point of the vehicle 602 deviated from the road 601, more accurate recognition can be achieved for the entrance point where the entrance 604 of the parking lot of the destination is located.

The traveling path information representing the traveling path 620 of the vehicle 602 may automatically be recorded for a predetermined time period (e.g., five minutes) on the recording medium such as the magnetic disc 405 and the optical disc 407 or a memory not shown. The automatically recorded traveling path information is recorded in a cyclic manner and information older than a given elapsed period of time may be erased.

Returning to the description of the flowchart of FIG. 5, the recognized entrance point of the parking lot of the destination is recorded on the recording medium such as the magnetic disc 405 and the optical disc 407 (step S510), and a sequence of the process of the flowchart is terminated. If it is determined at step S508 that the parking position is not within the predetermined range of the destination when it is determined that the vehicle is parked (step S508: NO), the procedure returns to step S502 to repeat a sequence of the process.

If only the deviation point located within the predetermined range of the destination is temporarily saved at step S506, the determination process executed at step S508 may be omitted and the temporarily saved deviation point may be recognized as an entrance point of the parking lot of the destination.

Plural parking lot entrance points can be recorded for one destination.

Along with the recognized entrance point of the parking lot, an entering method at the time of entrance of the vehicle into the parking lot may also be correlated with the entrance point of the parking lot of the destination and recorded onto the recording medium such as the magnetic disc 405 and the optical disc 407 or a memory, etc., not shown. The entering method into the parking lot entrance is information indicating how the vehicle enters the parking lot entrance from a road and may be information indicating that the vehicle can turn right, turn left, or go straight to enter the parking lot entrance from a road, for example.

The entering method may be determined with the use of the position information indicating the current position of the vehicle identified at step S504, the output values from the various sensors 416, and the map information, for example. Specifically, position information indicating the current position of the vehicle, the traveling direction of the vehicle, and the road shape data of the road of the traveling vehicle are utilized to determine, for example, that the vehicle turns right to enter into the parking lot entrance at the opposite side of the road. Steering operations, etc., performed by a driver may be detected to determine what degree of angle is formed relative to the direction of the road when entering the parking lot entrance.

If the type of the parking lot is determined with the use of the position information indicating the current position of the vehicle identified at step S504, the values output from the various sensors 416, the map information, etc., the type of the parking lot may be recorded and correlated with the destination.

The type of the parking lot may be information indicating an outdoor parking lot, a multilevel parking lot, and an underground parking lot. When determining the type of the parking lot, for example, if the sensitivity does not change in the signals received from the GPS satellites by the GPS receiver, the parking lot is determined as an outdoor parking lot. For example, if the signals cannot be received from the GPS satellites located in a vertical direction or if it is detected that the mobile object ascends up a slope, the parking lot is determined as a multilevel parking lot. For example, if the reception sensitivity of the signals is determined to be low, less than or equal to a threshold value, or if it is detected that the mobile object descends down a slope, the parking lot is determined as an underground parking lot. The number of turns made by the vehicle within the parking lot may be measured by the various sensors 416 to determine the number of levels of the parking lot.

Various pieces of information recorded and correlated with the destination may be displayed along with the parking lot information on the display 413 and presented to a driver when the driver performs destination retrieval, for example.

When the route retrieval is performed for a destination for which an entrance point to a parking lot recorded, a route to the entrance point of the parking lot of the destination can be retrieved. If the entering method into the parking lot entrance is also recorded, a route taking into account the entering method can be retrieved. For example, if the recorded entering method indicates that the vehicle can turn left to enter the parking lot entrance, a route is retrieved that enables the vehicle to turn left and enter into the parking lot entrance.

Another example of a position recording process procedure of the navigation apparatus 400 according to the example of the present invention is described. FIG. 7 is a flowchart of another example of the position recording process procedure of the navigation apparatus according to the example of the present invention. Details of the process described in the flowchart of FIG. 7 are descriptions of a process when the vehicle returns onto a road again after the entrance point of the parking lot is recorded on the recording medium such as the magnetic disc 405 and the optical disc 407 or the memory not shown at step S510 of the flowchart of FIG. 5.

As shown in the flowchart of FIG. 7, details of the process executed by the navigation apparatus 400 at steps S701 to S704 are identical to the details of the process from step S502 to step S505 described in the flowchart of FIG. 5 and, therefore, description thereof is omitted and description herein begins from the process of step S705.

If it is determined at step S704 that the current position of the vehicle is on a road (step S704: YES), a returning point of the vehicle onto the road from outside the road is recognized as an exit point from the parking lot (step S705). The returning point is the first current position of the vehicle identified to be on a road.

When the returning point of the vehicle onto the road from outside the road is detected, the returning point may be detected with the use of traveling path information acquired by recording a traveling path of the vehicle. For example, if it is determined that the current position of the vehicle is on a road, a traveling path of the vehicle before the determination may be traced back to detect the returning point of the vehicle onto a road from outside the road. A specific example of detecting the returning point is briefly described here.

Figures 1, 8:
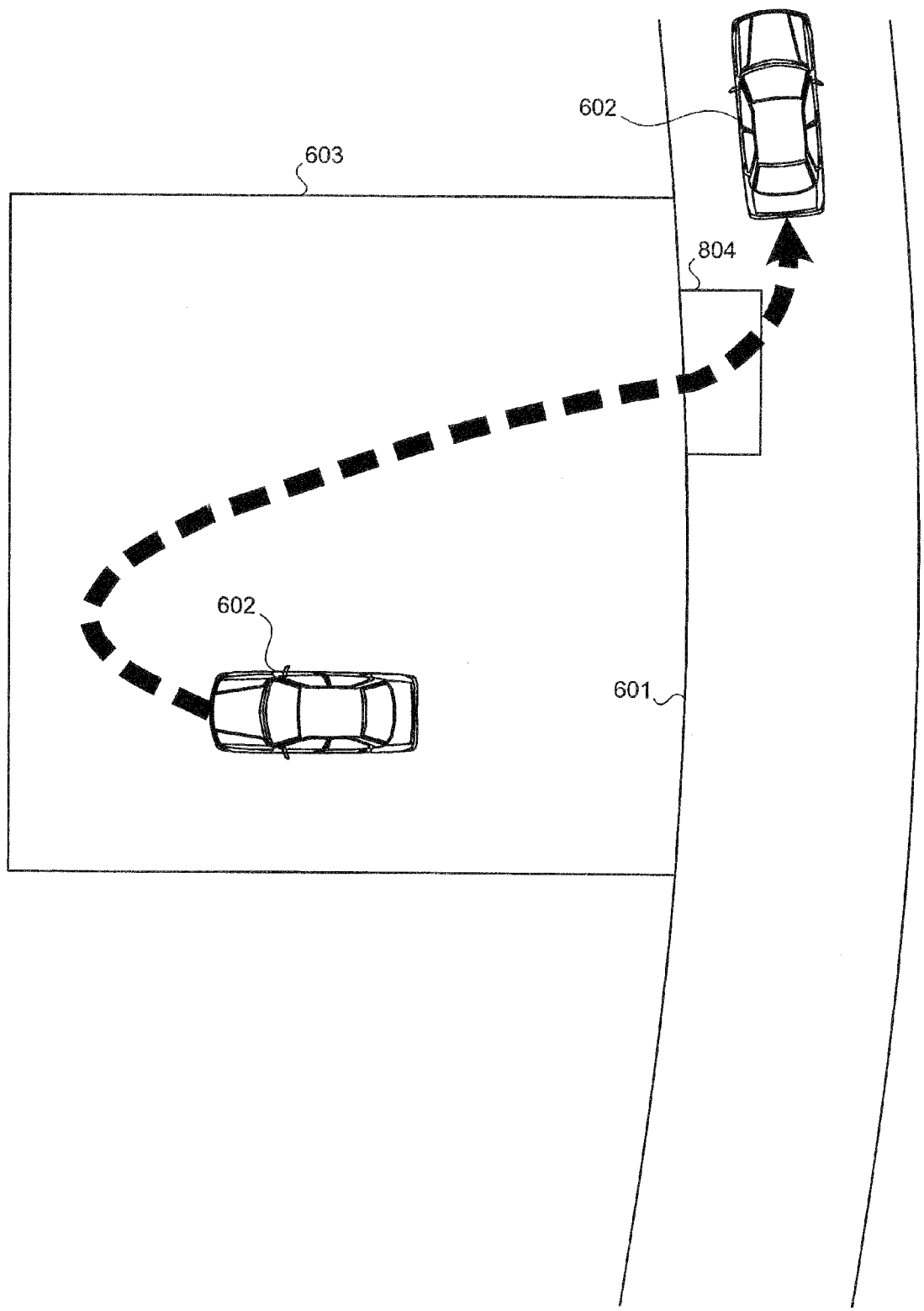
Figures 2, 8:
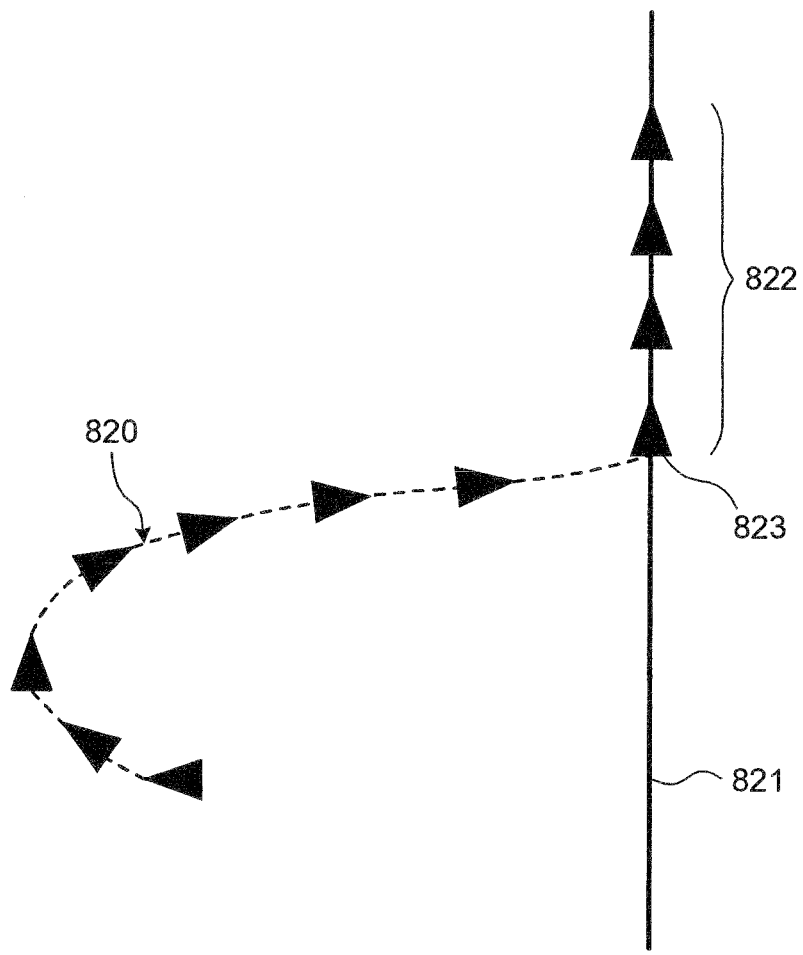

FIG. 8-1 is a view of an example of a case when a vehicle exits from a parking lot of the destination onto a road. FIG. 8-2 is an explanatory view for explaining a process when the returning point is detected. As shown in FIG. 8-1, the vehicle 602 exits from an exit of the parking lot of the destination and returns onto the road 601 to start traveling again in this case.

A traveling path 820 of the vehicle 602 shown in FIG. 8-2 represents a traveling path of the vehicle until the vehicle 602 exits the parking lot 603 of the destination and returns onto the road 601. Points indicated on the traveling path 820 indicate the current positions of the vehicle 602 at respective times, e.g., predetermined time intervals.

The returning point of the vehicle 602 onto the road 601 is detected from among the current positions of the vehicle 602 indicated on the traveling path 820. Specifically, for example, based on the position information concerning the points indicated on the traveling path 820 and a road link 821 of the road 601 included in the road shape data, and from among road points 822 indicative of current positions on the road 601, a point 823 identified as the first current position of the mobile object is calculated, and this point 823 is the returning point of the vehicle 602 onto the road 601.

The detected returning point (point 823) is recognized as an exit point where the exit 804 of the parking lot of the destination is located. Since this enables more accurate detection of the returning point of the vehicle 602 exiting from the parking lot of the destination to return onto the road 601, more accurate recognition can be achieved for the exit position where the exit 804 of the parking lot of the destination is located.

The traveling path information representing the traveling path 820 of the vehicle 602 may be recorded automatically for a predetermined time period (e.g., five minutes) on the recording medium such as the magnetic disc 405 and the optical disc 407 or a memory not shown. The automatically recorded traveling path information is recorded in a cyclic manner and information older than a given elapsed period of time may be erased.

Returning to the description of the flowchart of FIG. 7, after the returning point of the vehicle that has returned onto the road from outside the road is recognized as the exit point of the parking lot of the destination at step S705, the recognized exit point of the parking lot of the destination is recorded onto the recording medium such as the magnetic disc 405 and the optical disc 407 or a memory, etc., not shown (step S706), and a sequence of the process of the flowchart is terminated. If it is determined that the current position of the vehicle is not on the road at step S704 (step S704: NO), the process returns to step S701 to repeat a sequence of the process of the flowchart.

Plural parking lot entrance points may be recorded for one destination.

Along with the position information of the recognized exit point of the parking lot of the destination, an exiting method at the time of exiting of the vehicle from the parking lot may also be recorded, onto the recording medium such as the magnetic disc 405 and the optical disc 407 or a memory, etc., not shown, and correlated with the exit point of the parking lot of the destination. The exiting method from the parking lot exit is information indicating how the vehicle exits from the parking lot exit onto a road and may be information indicating that the vehicle can turn right, turn left, or go straight to exit from the parking lot exit onto a road, for example.

The exiting method may be determined with the use of the position information indicating the current position of the vehicle identified at step S703, the output values from the various sensors 416, and the map information, for example. Specifically, position information indicating the current position of the vehicle, the traveling direction of the vehicle, and the road shape data of the road of the traveling vehicle are utilized to determine whether the vehicle turns right to return on the road or turns left to return on the road, for example.

If the entrance point of the parking lot of the destination recognized at step S509 of the flowchart of FIG. 5 is determined as substantially the same position as the exit point of the parking lot of the destination recognized at step S705 of the flowchart of FIG. 7, the entrance point and the exit point of the parking lot may be recognized as an entrance/exit point of the parking lot of the destination. This enables more accurate recognition of the entrance/exit of the parking lot of the destination.

When a route to a different destination is retrieved from the inside of a parking lot of a destination (place other than a road and within a predetermined range from the destination) for which an exit point of a parking lot has been recorded, a route taking into account the exit point of the parking lot of the destination can be retrieved. If the exiting method is also recorded and correlated with the exit point of the parking lot of the destination, a route taking into account the exiting method can be retrieved. For example, if the recorded exiting method indicates that the vehicle can turn left from the parking lot exit to return on the road, a route having a left turn to exit the parking lot is retrieved.

As described above, according to this example, if the first position of the vehicle is identified to be on a road and a second position of the vehicle is identified to be off the road within a predetermined range from a destination after the first position of the vehicle is identified to be on the road, and it is determined that the vehicle is parked, the navigation apparatus 400 can automatically record the deviation point from the road as an entrance point of a parking lot. If the position of the vehicle identified to be within the parking lot of the destination is identified to be on a road, the navigation apparatus 400 can automatically record, as an exit point of the parking lot of the destination, the returning point of the vehicle that has returned onto the road.

A predetermined range from the destination can be set arbitrarily in accordance with the destination. Therefore, a deviation point of the vehicle that has deviated from a road can be correlated with a destination at a suitable distance from a place where the vehicle is parked, and the deviation point can be recorded as an accurate entrance point of the parking lot of the destination.

When the route retrieval is performed for a destination for which an entrance point to a parking lot has been recorded, the navigation apparatus 400 can retrieve a route to the entrance point of the parking lot of the destination. Since this enables a user to check the entrance point of the parking lot when the user arrives at the parking lot of the destination along the retrieved route, the user can easily enter the parking lot of the destination.

When a route is retrieved to a different destination from the inside of a parking lot of a destination for which an exit point of a parking lot has been recorded, the navigation apparatus 400 can retrieve a route taking into account the exit point of the parking lot. Therefore, a user can know the traveling direction of the vehicle in advance when exiting the parking lot.

The navigation apparatus 400 can record and correlate the entering method to the parking lot entrance, the exiting method from the parking lot exit, and a type of the parking lot with the entrance point and the exit point of the parking lot of the destination. Therefore, for example, when a route to the parking lot of the destination is retrieved, a route taking into account the entering method into the parking lot entrance can be retrieved. When a route from the parking lot of the destination to a different destination is retrieved, a route taking into account the exiting method from the parking lot exit can be retrieved.

As described above, the navigation apparatus 400 can automatically record, according to the utilization environment of a user, various pieces of information such as an entrance point and an exit point, not preliminarily recorded as map information, of a parking lot of a predetermined point (a point set as a destination) and can utilize the information when a user conducts route retrieval, etc. Therefore, the user can obtain the optimal retrieval suitable for the utilization environment, and convenience for the user can be improved.

The position registering method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:
1. A position registering apparatus comprising:
an acquiring unit that acquires traveling state information indicating a traveling state of a mobile object;
a destination setting unit that sets at least one set destination;

a position identifying unit that identifies a first position of the mobile object, based on the traveling state information and map information, to be on a road, and thereafter identifies a second position of the mobile object to be off the road after identifying that the first position of the mobile object is on the road;

a parking determining unit that, after the first position of the mobile object has been identified to be on the road and then the second position of the mobile object has been identified to be off the road, determines that the mobile object is parked off the road, after being on the road, within a predetermined range from the set destination; and a registering unit that, after (i) the first position of the mobile object is identified to be on the road, (ii) the second position of the mobile object is identified to be off the road after identifying that the first position of the mobile object is on the road, and (iii) the mobile object is determined to be parked off the road, starts to register into a storage unit a first deviation point from the road as an entrance point to a parking lot of the set destination, the registering unit being configured to register a second deviation point different from the first deviation point as a second entrance point to the parking lot for the same set destination to thereby register, into the storage unit, a plurality of the entrance points for each of at least one set destination.

2. The position registering apparatus according to claim 1, wherein after at least one of the entrance points of the parking lot of the set destination has been registered, the registering unit registers into the storage unit a returning point onto the road as an exit point of the parking lot of the set destination.

3. The position registering apparatus according to claim 1, wherein one of the plurality of registered entrance points is thereafter set in association with the set destination, and a route to the set destination is obtained to one of the plurality of registered entrance points set in association with the set destination.

4. A position registering apparatus comprising:
an acquiring unit that acquires traveling state information indicating a traveling state of a mobile object;
a destination setting unit that sets a destination;
a position identifying unit that identifies a first position of the mobile object, based on the traveling state information and map information, to be on a road, and thereafter identifies a second position of the mobile object to be off the road after identifying that the first position of the mobile object is on the road;
a parking determining unit that, after the first position of the mobile object has been identified to be on the road and then the second position of the mobile object has been identified to be off the road, determines that the mobile object is parked off the road, after being on the road, within a predetermined range from the set destination, the predetermined range being set according to a type of the set destination; and
a registering unit that, after (i) the first position of the mobile object is identified to be on the road, (ii) the second position of the mobile object is identified to be off the road after identifying that the first position of the mobile object is on the road, and (iii) the mobile object is determined to be parked off the road, starts to register into a storage unit a deviation point from the road as an entrance point to a parking lot of the set destination, such that thereafter, the registered entrance point is settable as the set destination.

5. A route retrieving apparatus comprising:
a position registering apparatus including an acquiring unit that acquires traveling state information indicating a traveling state of a mobile object;
a destination setting unit that sets at least one set destination;
a position identifying unit that identifies a first position of the mobile object, based on the traveling state information and map information, to be on a road, and thereafter identifies a second position of the mobile object to be off the road after identifying that the first position of the mobile object is on the road;
a parking determining unit that, after the first position of the mobile object has been identified to be on the road and then the second position of the mobile object has been identified to be off the road, determines that the mobile object is parked off the road, after being on the road, within a predetermined range from the at least one set destination; and
a registering unit that, after (i) the first position of the mobile object is identified to be on the road, (ii) the second position of the mobile object is identified to be off the road after identifying that the first position of the mobile object is on the road, and (iii) the mobile object is determined to be parked off the road, starts to register into a storage unit a first deviation point from the road as an entrance point to a parking lot of the at least one set destination; and
a route retrieving unit that retrieves a route to the set destination, the registering unit being configured to register a second deviation point different from the first deviation point as a second entrance point for the at least one set destination to thereby register, into the storage unit, a plurality of the entrance points for the at least one set destination, and the route retrieving unit, when an entrance point of the parking lot of the at least one set destination has been registered, retrieves a route to the entrance point of the parking lot.

6. A route retrieving apparatus comprising:
a position registering apparatus including an acquiring unit that acquires traveling state information indicating a traveling state of a mobile object,
a destination setting unit that sets at least one set destination;
a position identifying unit that identifies a first position of the mobile object, based on the traveling state information and map information, to be on a road, and thereafter identifies a second position of the mobile object to be off the road after identifying that the first position of the mobile object is on the road;
a parking determining unit that, after the first position of the mobile object has been identified to be on the road and then the second position of the mobile object has been identified to be off the road, determines that the mobile object is parked off the road, after being on the road, within a predetermined range from the at least one set destination;
a registering unit that, after (i) the first position of the mobile object is identified to be on the road, (ii) the second position of the mobile object is identified to be off the road after identifying that the first position of the mobile object is on the road, and (iii) the mobile object is determined to be parked off the road, starts to register into a storage unit a first deviation point from the road as an entrance point to a parking lot of the at least one set destination; and a route retrieving unit that retrieves a route to the at least one set destination, the registering unit being configured to register a second deviation point as a second entrance point for the at least one set destination to thereby register, into the storage unit, a plurality of entrance points for the at least one set destination, wherein after a third position of the mobile object is identified to be on the road or on another road after being off the road and after an entrance point of the parking lot of the destination has been registered, the registering unit registers into the storage unit a returning point onto the or onto the other road as an exit point of the parking lot of the at least one set destination, and when the mobile object is identified to be at the second position off the road and within the predetermined range from the at least one set destination for which an exit point is registered, and when a different destination different from the at least one set destination is subsequently set, the route retrieving unit retrieves a route from the exit point to the different destination.

7. A position registering method comprising:

acquiring traveling state information indicating a traveling state of a mobile object at an acquiring unit;

setting at least one set destination at a setting unit;

identifying, at a position identifying unit, a first position of the mobile object, based on the traveling state information and map information, to be on a road and thereafter identifying a second position of the mobile object to be off the road after identifying that the first position of the mobile object is on the road;

after the first position of the mobile object has been identified to be on the road and then the second position of the mobile object has been identified to be off the road, determining, at a parking determining unit, that the mobile object is parked off the road, after being on the road, within a predetermined range from the at least one set destination; and after (i) the first position of the mobile object is identified to be on the road, (ii) the second position of the mobile object is identified to be off the road after identifying that the first position of the mobile object is on the road, and (iii) the mobile object is determined to be parked off the road, starting to register, by a registering unit, into a storage unit a first deviation point from the road as an entrance point to a parking lot of the at least one set destination, wherein the registering includes registering into the storage unit, a plurality of entrance points for the at least one set destination, wherein one or more processing devices cause one or more of the acquiring unit, the setting unit, the position identifying unit, the parking determining unit and the registering unit to respectively acquire the traveling state information, set the set destination, identify the position, determine that the mobile object is parked, and register the deviation points.

8. The position registering method according to claim 7, further comprising:

setting one of the plurality of registered entrance points in association with the set destination; and obtaining a route to the set destination to one of the plurality of registered entrance points set in association with the set destination.

9. A position registering method comprising:

acquiring traveling state information indicating a traveling state of a mobile object at an acquiring unit;

setting a set destination at a setting unit;

identifying, at a position identifying unit, a first position of the mobile object, based on the traveling state information and map information, to be on a road and thereafter identifying a second position of the mobile object to be off the road after identifying that the first position of the mobile object is on the road;

after the first position of the mobile object has been identified to be on the road and then the second position of the mobile object has been identified to be off the road, determining, at a parking determining unit, that the mobile object is parked off the road, after being on the road, within a predetermined range from the set destination, the predetermined range being set according to a type of the set destination; and after (i) the first position of the mobile object is identified to be on the road, (ii) the second position of the mobile object is identified to be off the road after identifying that the first position of the mobile object is on the road, and (iii) the mobile object is determined to be parked off the road, starting to register, by a registering unit, into a storage unit a deviation point from the road as an entrance point to a parking lot of the set destination, wherein one or more processing devices cause one or more of the acquiring unit, the setting unit, the position identifying unit, the parking determining unit and the registering unit to respectively acquire the traveling state information, set the set destination, identify the position, determine that the mobile object is parked, and register the deviation points.

10. A computer-readable recording medium storing therein a position-registering computer program that causes a computer to execute a method comprising:

acquiring traveling state information indicating a traveling state of a mobile object;

setting at least one set destination;

identifying a first position of the mobile object, based on the traveling state information and map information, to be on a road and thereafter identifying a second position of the mobile object to be off the road after identifying that the first position of the mobile object is on the road;

after the first position of the mobile object has been identified to be on the road and then the second position of the mobile object has been identified to be off the road, determining that the mobile object is parked off the road, after being on the road, within a predetermined range from the at least one set destination; and after (i) the first position of the mobile object is identified to be on the road, (ii) the second position of the mobile object is identified to be off the road after identifying that the first position of the mobile object is on the road, and (iii) the mobile object is determined to be parked off the road, starting to register into a storage unit a first deviation point from the road as an entrance point to a parking lot of the at least one set destination, wherein the registering includes registering into the storage unit, a plurality of entrance points for the at least one set destination.

11. The computer-readable recording medium according to clam 10, further comprising:

setting one of the plurality of registered entrance points in association with the set destination; and obtaining a route to the set destination to one of the plurality of registered entrance points set in association with the set destination.

12. A computer-readable recording medium storing therein a position-registering computer program that causes a computer to execute a method comprising:

acquiring traveling state information indicating a traveling state of a mobile object;

setting a set destination;

identifying a first position of the mobile object, based on the traveling state information and map information, to be on a road and thereafter identifying a second position of the mobile object to be off the road after identifying that the first position of the mobile object is on the road;

after the first position of the mobile object has been identified to be on the road and then the second position of the mobile object has been identified to be off the road, determining that the mobile object is parked off the road, after being on the road, within a predetermined range from the set destination, the predetermined range being set according to a type of the set destination; and after (i) the first position of the mobile object is identified to be on the road, (ii) the second position of the mobile object is identified to be off the road after identifying that the first position of the mobile object is on the road, and (iii) the mobile object is determined to be parked off the road, starting to register into a storage unit a deviation point from the road as an entrance point to a parking lot of the set destination.

13. A position registering method comprising:

setting a destination at a setting unit;

acquiring traveling state information indicating a traveling state of a mobile object at an acquiring unit;

monitoring whether a first position of the mobile object is on a road or a second position of the mobile object is off a road, based on the traveling state information and map information, at a monitoring unit;

identifying, at a position identifying unit, that the first position of the mobile object is on the road and thereafter identifying that the second position of the mobile object is off the road after identifying that the first position of the mobile object is on the road;

after the first position of the mobile object has been identified to be on the road and then the second position of the mobile object has been identified to be off the road, determining, by a parking unit, that the mobile object is parked off the road, after being on the road, within a predetermined range from the set destination, the predetermined range being set according to a type of the set destination; and after (i) the first position of the mobile object is identified to be on the road, (ii) the second position of the mobile object is identified to be off the road after identifying that the first position of the mobile object is on the road, and (iii) the mobile object is determined to be parked off the road, starting to register, by a registering unit, into a storage unit a deviation point from the road as an entrance point to a parking lot of the set destination when the mobile object is determined to be parked off the road within a predetermined range from the set destination after being on the road, wherein one or more processing devices cause one or more of the acquiring unit, the setting unit, the position identifying unit, the parking determining unit and the registering unit to respectively acquire the traveling state information, set the set destination, identify the position, determine that the mobile object is parked, and register the deviation points.

* * * * *

UNITED STATES PATENT AND TRADEMARK OFFICE
CERTIFICATE OF CORRECTION

PATENT NO.       : 8,521,425 B2                                    Page 1 of 1
APPLICATION NO.  : 12/282559
DATED            : August 27, 2013
INVENTOR(S)      : Sakata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 845 days.

Signed and Sealed this
Fifteenth Day of September, 2015

Michelle K. Lee
*Director of the United States Patent and Trademark Office*